F. E. MOSS.
APPARATUS FOR SEPARATING SOLID MATTERS FROM FLUIDS OR FLUIDS FROM FLUIDS.
APPLICATION FILED FEB. 15, 1917.

1,240,081.
Patented Sept. 11, 1917.

Inventor:
Francis E. Moss.

By

Atty.

UNITED STATES PATENT OFFICE.

FRANCIS EVAN MOSS, OF WORTHINGTON, NEAR WIGAN, ENGLAND.

APPARATUS FOR SEPARATING SOLID MATTERS FROM FLUIDS OR FLUIDS FROM FLUIDS.

1,240,081.   Specification of Letters Patent.   Patented Sept. 11, 1917.

Application filed February 15, 1917. Serial No. 148,877.

*To all whom it may concern:*

Be it known that I, FRANCIS EVAN MOSS, a subject of the King of England, residing at Worthington, near Wigan, in the county of Lancaster, England, have invented new and useful Improvements in Apparatus for Separating Solid Matters from Fluids or Fluids from Fluids, of which the following is a specification.

This invention has for its object to provide an effective and convenient apparatus or means for removing solids from fluids— liquid or gaseous, or liquids from liquids, of different viscosities or characters.

According to this invention, in a conduit through which the body to be acted upon flows, there are a plurality or multiplicity of sets of inwardly projecting parts, preferably inclined, so that there are a plurality of sets of baffles or catching devices extending in the longitudinal direction, which diminish the area of the conduit, and form chambers or recesses between their inner edges and the wall of the conduit, and in these chambers or recesses the heavier or more viscous body in the compound fluid body will be caused to deposit and collect. These chambers or spaces, so formed, constitute in fact more or less quiescent collecting or depositing chambers or spaces; and they may consist of a plurality of pockets inclined from the wall of the conduit to their inner edges, or they may be in the form of annular pockets or chambers.

When the apparatus is made of metal, these inwardly projecting parts may be produced by pressing, stamping, or cutting and bending, the metal of which the conduits are formed, inward, into the form of pocket or recess desired.

When air or gas containing solid substances such as fine dust or "smoke," or a liquid containing a solid or a proportion of another liquid of greater viscosity, it will have to pass on its way through the apparatus a plurality or multiplicity of these sets of inwardly projecting baffles or catching devices one after the other, and by their effect upon the stream, and the currents and character of flow produced, the result will be that the solid matter or the liquid of greater viscosity will collect in the relatively quiescent chambers or recesses, so that when the fluid has passed the last of these sets of chambers or recesses, it will be free of the body it is desired to intercept and separate. As stated, the forms of the chambers may vary, and adapted to suit different kinds of compound fluid bodies it is desired to operate upon, for separating one from another.

Figure 2:
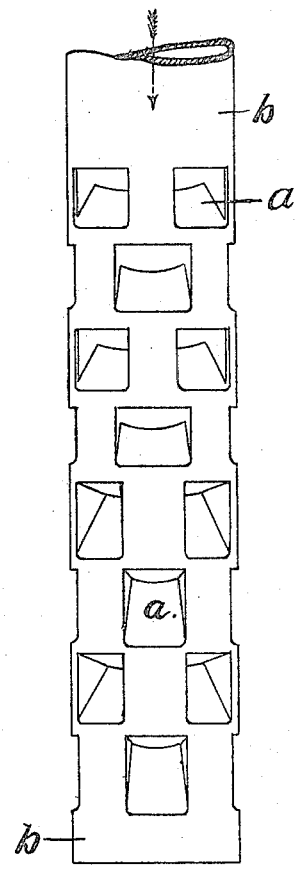
Figure 1:
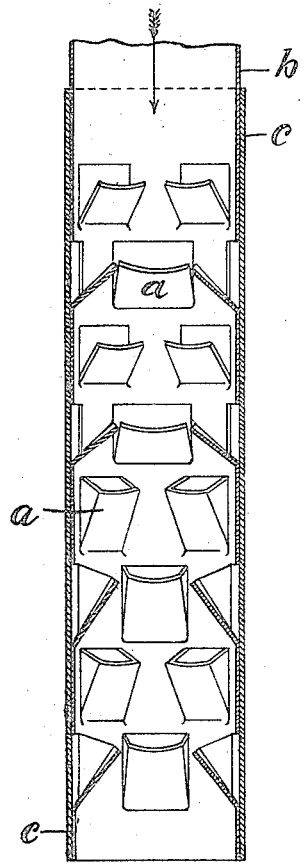
Figure 4:
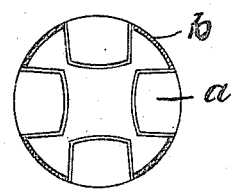
Figure 3:
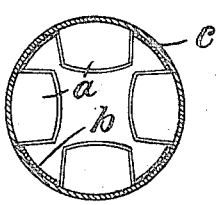

The invention will be further described with reference to the accompanying drawings, Figure 1 of which is an elevation in section, and Fig. 2 an outside elevation of the conduit containing the separating and collecting chambers or devices; while Figs. 3 and 4 are cross sections through the lower and upper parts of the apparatus.

In the example given in the drawings, the intercepting or separating and collecting devices or pockets are marked $a$, and they are provided by pressing or stamping these parts inwardly out of a metal tube $b$; and this tube $b$ will be connected with the conduit from which the compound fluid is flowing. Outside this tube $b$ there is employed another tube $c$ and forming a closure to the openings in the tube $b$ from which the parts $a$ have been stamped or pressed, and when the pockets, chambers or recesses $a$ have collected a certain quantity of the part of body in the fluid to be separated or removed, the outer tube $c$ can be removed from the tube $b$, and the separated matters can be withdrawn or discharged from the receptacles, pockets, or catching devices $a$. Or, if desired, as an alternative, the tube $c$ may be stationary, and the tube $b$ containing the devices $a$ can be removable.

After passing through the apparatus, the gases or fluids leaving it, can be discharged into the open, or the apparatus may be connected by other pipes or conduits to any place of discharge as may be desired.

The devices $a$ in the upper part of the tube $b$, simply consist of plates pressed out of the tube into the inclined position shown; while in the lower portion of the tube, the devices $a$ are pressed inward from the tube, and have side portions; and thus the pockets or chambers formed of them are inclosed on the sides by their own metal, and on the back by the tubes $c$, and are only open above; but as above stated the form or manner of placing these devices will depend upon the purposes to which the apparatus is to be used.

While the part in which the inwardly projecting pockets or chambers $a$ have been described as being formed in or on a tube or conduit, this device or devices similar to them may be secured to a cage or carrier which can be introduced into the outer inclosing conduit, or a box or chest, and the fluid passed through the apparatus as above described.

What is claimed is:—

1. An apparatus of the class described comprising an inner vertical flue formed with a plurality of inwardly and upwardly extending baffles arranged at different levels, and each bent to form a cup to catch by gravity solids contained in fluids passing through the apparatus, the flue having an opening adjacent each cup for the removal of the collected solids, an outer vertical flue surrounding the inner vertical flue, said inner and outer vertical flues being movable with reference one to the other to expose the openings to remove the substance collected on the cups.

2. An apparatus of the class described comprising an inner vertical flue formed with a plurality of inwardly and upwardly extending cup shaped collectors arranged at different levels and in alternate rows, the cups at the bottom of the flue having side walls to increase their capacity, the inner vertical flue having openings adjacent the cups to permit the removal of the collected matter, an outer vertical flue for covering the openings, the inner and outer vertical flues being movable one on the other to uncover the openings to permit removal of the collected matter on the cups.

3. An apparatus of the class described comprising inner and outer vertical flues, one fitted over the other, the inner vertical flue having a plurality of openings closed by the outer vertical flue, and cups on the inner flue arranged adjacent the openings to collect and retain solids contained in fluid passed through the apparatus.

In testimony whereof I have signed my name to this specification in the presence of two subscribing witnesses.

FRANCIS EVAN MOSS.

Witnesses:
SOMERVILLE GOODALL,
NELSON GUY.

Copies of this patent may be obtained for five cents each, by addressing the "Commissioner of Patents, Washington, D. C."